United States Patent Office 3,297,598
Patented Jan. 10, 1967

3,297,598
RUBBER COMPOSITION
George S. Mills, Boonton, N.J., assignor to United States Rubber Company, New York, N.Y., a corporation of New Jersey
No Drawing. Filed June 5, 1963, Ser. No. 285,607
5 Claims. (Cl. 260—3)

This invention relates to rubber compositions containing a hydrated silica as a reinforcing filler and having improved physical properties.

Precipitated hydrated silicas are known reinforcing fillers for rubbers. Such hydrated silicas have a particle size (average diameter of the particles) not greater than 1 micron, generally from 100 to 10,000 Angstrom units, and the degree of hydration is not less than that represented by 0.02 gram of moisture per 100 square meters of surface area. One commercial form of hydrated silica is "Hi-Sil" which has a particle size of about 200 Angstrom units and a surface area of about 150 square meters per gram, and which contain about 10.7% of water of hydration, corresponding to 0.073 gram of water per 100 square meters of surface area. Another commercial form of hydrated silica is "Ludox" which has a particle size of about 250 Angstrom units and a surface area of 125 square meters per gram, and which contains 5.6% of water of hydration corresponding to 0.046 gram of water per 100 square meters of surface area.

Whitby in "Synthetic Rubber" (John Wiley & Sons, New York, 1954) on pages 406 and 407 states that the use of 5 to 10 percent of diethylene glycol based on the weight of hydrated silica in silica-reinforced SBR improves the physical properties, as does the use of approximately 10 parts of coumarone-indene resin.

I have found that the physical properties of certain rubbers that are reinforced with hydrated silica are greatly improved by incorporating therein an epoxy resin.

Rubbers that show the improvements of the present invention are natural Hevea rubber, copolymers of a major proportion of butadiene and a minor proportion of styrene called SBR (e.g., SBR 1500 a copolymer of butadiene and styrene containing 22.5 to 24.5 percent bound styrene), copolymers of a major proportion of isobutylene and a minor proportion of a conjugated diene such as isoprene (butyl rubber, e.g., copolymer of 95 to 99 parts of isobutylene and correspondingly 5 to 1 parts of isoprene), terpolymers of ethylene and propylene with a minor proportion of a non-conjugated diene such as dicyclopentadiene or 1,4-hexadiene (e.g., terpolymer of 55% propylene, 41% ethylene and 4% 1,4-hexadiene), 1,4-polybutadiene and 1,4-polyisoprene.

Various epoxy resins improve the physical properties of such rubbers that are compounded with reinforcing hydrated silicas. The examples below illustrate the effectiveness of the following classes of epoxy resins.

(I) Condensation products of epichlorhydrin and a diphenol, e.g., 4,4'-isopropylidenediphenol, commonly called biphenol A. "Epoxy Resins" by Irving Skiest, published by Reinhold Publishing Corporation, New York (1958) on pages 1 to 20 describes these epoxy resins, and on page 203 identifies a number of epoxy resins commercially available under the trademark name of "Epon." Epon 828 is described as having a specific gravity of 1.16, a viscosity of 135–195 poises at 25° C., an average molecular weight of 390, and an epoxide equivalent of 185–205 (the number of grams of resin containing one gram-equivalent of epoxide).

(II) Epoxidized polyolefin resins, e.g., epoxidized polybutadiene (Greenspan et al., U.S. Patent 2,826,556), and epoxidized unsaturated polymeric hydrocarbon resins obtained by the polymerization of unsaturated alicyclic fractions of petroleum (Greenspan et al., U.S. Patent 2,833,747). Also see "Epoxidized Polyolefin Resins" by Greenspan et al., Modern Plastics, October 1959, pp. 142, 144, 146, 226. Oxiron 2000, a commercial polyepoxide resin of this type, is described in the article "Epoxidized Polyolefin Resins" by Johnston et al., Modern Plastics, April 1961, pp. 135, 136, 138, 140, 143, 198, as having an aliphatic backbone structure, a specific gravity of 1.01, a viscosity of 1800 poises at 25° C., and an epoxy equivalent of 177.

(III) Condensation products of epichlorhydrin and a polyhydric alcohol, e.g., glycerine. "Epoxy Resins" by Irving Skiest (loc. cit.) on pages 18 to 20 describes these epoxy resins. A commercial resin of this type made by condensing epichlorhydrin and glycerine to form a water-soluble resinous diglycidyl ether of glycerine is Eponite 100, which has a molecular weight of about 400, a viscosity of 90–150 centipoises at 25° C. and an epoxide equivalent of about 150.

The amount of reinforcing hydrated silica will be from 40 to 100 parts per 100 parts of rubber, and in such stocks the amount of epoxy resin will be from 1 to 10 parts per 100 parts of rubber. In practice, it is desirable but not necessary to incorporate in the rubber compound a known curing agent or so-called catalyst for the epoxy resin. Such curing agents are described in "Epoxy Resins" by Irving S. Skiest (loc. cit.) on pages 21 to 58. Amine curing agents are preferred, e.g., ethylenediamine, piperidine, pyridine, diethylenetriamine, tetraethylene pentamine, and "Trimene Base" (reaction product of ethyl chloride, formaldehyde and ammonia). The curing agent for the epoxy resin will be used in amount from 0.5 to 2 parts per 100 parts of rubber.

In carrying out the present invention, it is desirable to prepare the rubber-silica filler masterbatch, first, before the epoxide treatment, using the usual rubber processing equipment, such as a Banbury or two-roll mill. Temperature of the components is desirably in the 80° F.–250° F. range. The epoxy resin and the curing agent if used, are then incorporated in the masterbatch in a sequential cycle which is preferably done at a stock temperature below 180° F.

One may now proceed in one of two ways:

One way is to add the further rubber compounding ingredients, except the accelerator, at a temperature as high as 150° F. The accelerator is added last and at about 80 to 125° F. The mix is now ready to be cured.

The second, and preferred method, is to subject the mixture of the rubber-silica filler, epoxy resin and curing agent if used, to an elevated temperature, for a time sufficient to produce a further enhancement of the properties of the cured stock. This is done by heating the mixture either under static conditions, as in an oven, or while masticating the mixture either in an internal mixer such as a Banbury or on an open two-roll mill, to an elevated temperature at which reaction between the components takes place. This reaction is not completely understood but appears to be a formation of bonds between the elastomer and filler resulting in an apparent partial cross-linking and gel formation. The temperature may be as low as 235° F., provided the time is made long enough, and can be as high as is possible without injuring the stock by decomposition. A temperature of 300 to 450° F. is preferred. Where heat treatment is conducted on the mill or in the Banbury, the heat of mixing may be used to elevate the temperature, or the apparatus may be heated extraneously if necessary. Typically, mixing in the Banbury or on the mill at 300–450° F. for from 2 to 15 minutes is satisfactory. This is called the "hot processing technique." After this heat treatment has been effected, the remainder of the compounding ingredients are added as in the first method.

The following examples illustrate the invention in more detail. In the examples following Example I, reference should be made to Example I for identification of materials and methods. Parts referred to herein are by weight.

EXAMPLE I

This example illustrates the use of the polyepoxide Epon 828 for improving the properties of Hi-Sil reinforced, oil-extended SBR, using the hot-processing technique.

A masterbatch, labeled MB, is made by mixing, in a Banbury for eleven minutes, the following:

| Materials: | Parts by weight |
|---|---|
| SBR 1500 | 42.9 |
| Synpol 8201 [1] | 257.1 |
| Hi-Sil | 180 |

This masterbatch is divided into three portions and mixed with further ingredients to give stocks A, B and C and further processed as shown below.

The following are mixed on the mill at 80–100° F.

| | Parts by Weight | | |
|---|---|---|---|
| Stock | A | B | C |
| Materials: | | | |
| MB | 160 | 160 | 160 |
| Diethylene glycol | 3.5 | | |
| Cumar MH1 [1] | | 6 | |
| Epon 828 | | | 3 |
| Trimene Base | | | 1 |

[1] Cumar MH1 is a coumarone-indene resin.

The above mixes are now mixed in the Banbury at 300–310° F. for seven minutes. This is the hot processing step. The following ingredients are now added and mixed in the Banbury eight minutes, dumping at 230–250° F.:

| | | | |
|---|---|---|---|
| Protox [1] | 5 | 5 | 5 |
| Flexamine [2] | 1 | 1 | 1 |
| Cumar MH1 | 6 | | 6 |
| Stearic Acid | 3 | 3 | 3 |

[1] Protox is zinc oxide.
[2] Flexamine is a physical mixture containing 65% of a complex diarylamineketone reaction product and 35% of a commercial N,N'-diphenyl-p-phenylenediamine.

and the following added on a cool mill:

| | | | |
|---|---|---|---|
| Diethylene glycol | | 3.5 | |
| MBTS [1] | 0.75 | 0.75 | 0.75 |
| DOTG [2] | 2.5 | 1.0 | 1.0 |
| Sulfur | 3 | 3 | 3 |

[1] MBTS is 2,2'-dithiolis(benzothiazole).
[2] DOTG is di-(ortho-tolyl)guanidine.

The stocks are press-cured at 292° F. for the times indicated.

| | A | | B | | C | |
|---|---|---|---|---|---|---|
| Time of cure, minutes | 45 | 90 | 45 | 90 | 45 | 90 |
| Physical Properties: | | | | | | |
| 300% Modulus, p.s.i. | 1,170 | 1,140 | 1,220 | 1,180 | 1,110 | 1,190 |
| Tensile at 77° F | 1,980 | 1,970 | 2,110 | 2,050 | 2,610 | 2,670 |
| Elongation at 77° F | 420 | 430 | 440 | 420 | 500 | 480 |
| Tensile at 212° F | 775 | 680 | 840 | 720 | 1,025 | 970 |
| Elongation at 212° F | 300 | 280 | 300 | 270 | 380 | 350 |
| Hardness, Shore A | 57 | 57 | 59 | 60 | 49 | 50 |
| Tear resistance at 250° F., lbs./in.[1] | 14 | 19 | 26 | 23 | 40 | 21 |
| Torsional Hyst.,[2] 77° F | 0.333 | 0.275 | 0.296 | 0.293 | 0.086 | 0.078 |
| Torsional Hyst.,[2] 280° F | 0.062 | 0.060 | 0.061 | 0.063 | 0.043 | 0.044 |
| Abrasion resistance, percent [3] | 69 | 67 | 60 | 49 | 97 | 88 |
| Cut-growth resistance,[4] kc./inch at 150° F | 34 | | 39 | | 59 | |

[1] "The Trousers Tear Test." A 3" x 1" sample is slit for 2 inches then the tear strength measured in a Scott Tensile machine.
[2] The method is described by Mooney et al., Rubber Chem. & Tech., 14, 35 (1941).
[3] Based on weight loss compared to a standard rated 100.
[4] Slight modification of ASTM D813, ASTM Standards (1961), part 11, page 361.

Compared to stocks A and B which did not contain polyepoxide, stock C containing the polyepoxide exhibits significantly higher tensile strength and elongation at both 77° F., and 212° F., abrasion resistance, and cut-growth resistance. At the same time, stock C has desirably lower hardness and torsional hysteresis at both 77° F. and 280° F.

EXAMPLE II

This example demonstrates the improvement of the properties of silica-reinforced SGR and oil-extended SBR Synpol 8202 by the addition of the polyepoxide Epon Resin 828, using an intermediate "hot-processing" step on the mixture of the rubber, filler, polyepoxide and Trimene Base.

Masterbatches (MB) are prepared by mixing the rubber and Hi-Sil, formulated as shown below, in the Banbury for twelve minutes at 250–280° F.

| | Parts | | | |
|---|---|---|---|---|
| Stock Code | D | E | F | G |
| Materials: | | | | |
| SBR-1500 | 100 | 100 | | |
| SBR-8202 [1] | | | 100 | 100 |
| Hi-Sil | 54 | 54 | 54 | 54 |
| Cumar MH1½ | 6 | | 6 | |
| Epon Resin 828 | | 2.5 | | 2 |
| Trimene Base | | 2 | | 2 |

[1] Synpol 8202 is an oil-extended SBR of 50 parts of oil per 100 parts of butadiene-styrene copolymer rubber, which rubber contains 22.5 to 24.5% bound styrene.

Compounding is completed by adding the following on a cool two-roll mill:

| | | | | |
|---|---|---|---|---|
| Cumar NH1½ | | 6 | | 6 |
| Protox | 5 | 5 | 5 | 5 |
| Flexamine | 1 | 1 | 1 | 1 |
| Stearic acid | 3 | 3 | 3 | 3 |
| MBTS | 0.75 | 0.75 | 0.75 | 0.75 |
| Sulfur | 3 | 3 | 3 | 3 |
| DOTG | 2.5 | 2 | 2.5 | 1.5 |

The stocks are press-cured at 292° F. for the indicated times.

| PHYSICAL PROPERTIES | | | | |
|---|---|---|---|---|
| 300% Modulus, p.s.i.: Time (min.): | | | | |
| 45 | 1,110 | 1,270 | 900 | 1,070 |
| 90 | 1,200 | 1,370 | 960 | 1,070 |
| Tensile at 77° F., p.s.i.: Time (min.): | | | | |
| 45 | 3,480 | 3,370 | 2,320 | 2,380 |
| 90 | 3,470 | 3,250 | 2,240 | 2,360 |
| Elongation at 77° F., percent: Time (min.): | | | | |
| 45 | 540 | 510 | 530 | 510 |
| 90 | 520 | 510 | 520 | 510 |
| Tensile at 212° F., p.s.i.: Time (min.): | | | | |
| 45 | | 1,200 | | 820 |
| 90 | 1,060 | | 600 | |
| Elongation at 212° F., percent: Time (min.): | | | | |
| 45 | | 350 | | 320 |
| 90 | 340 | | 280 | |
| Hardness, Shore A: Time (min.): | | | | |
| 45 | 57 | 57 | 49 | 49 |
| 90 | 59 | 58 | 51 | 51 |
| Tear resistance at 250° F., lbs./inch: Time (min.): | | | | |
| 45 | | 42 | | 24 |
| 90 | 36 | | 23 | |
| Torsional Hyst. at 280° F.: Time (min.): | | | | |
| 45 | | 9.061 | | 0.042 |
| 90 | 0.070 | | 0.050 | |
| Abrasion resistance, percent: Time (min.): | | | | |
| 45 | | 94 | | 88 |
| 90 | 84 | | 76 | |
| | 85 | | | |
| Cut-growth resistance, kc./inch at 150° F.: Time (min.): | | | | |
| 45 | | 94 | | 42 |
| 90 | 66 | | 14 | |

Compared to stocks D and F which do not contain polyepoxide, stocks E and G containing the polyepoxide exhibit significantly higher tensile and elongation at 212° F., abrasion resistance and cut-growth resistance. At the same time, stocks E and G have a significantly lower torsional hysteresis at 280° F.

EXAMPLE III

This example shows the improvement of the physical properties of hydrate silica-reinforced, oil-extended SBR by addition of the polyepoxide Epon 828 using "conventional" mixing techniques, i.e., the "hot-processing" step is omitted. The example also shows that the polyalkanolpolyamine Nalco L-1718 which is sold for improving the properties of rubber containing fillers, also improves the properties, but not as much. A masterbatch (MB) is prepared by mixing 300 grams of the oil-extended SBR 1707 of 37.5 parts of oil per 100 parts of butadiene-styrene copolymer rubber, which rubber contains 22.5 to 24.5% bound styrene with 180 grams of Hi-Sil in the Banbury for 12 minutes at 230–275° F. This is compounded on a two-roll mill at 150° F. as follows:

| Stock Code | H | I | J |
|---|---|---|---|
| MB | 160 | 160 | 160 |
| Epon resin 828 | | | 3 |
| Trimene Base | | | 1 |
| Cumar MH1 | 6 | 6 | 3 |
| Protox | 5 | 5 | 5 |
| Flexamine | 1 | 1 | 1 |
| Stearic acid | 3 | 3 | 3 |
| Nalco L-1718 | | 2 | 1 |
| MBTS | 0.75 | 0.75 | 0.75 |
| Triethanolamine | 1 | | |
| Sulfur | 3 | 3 | 3 |
| DOTG | 2.3 | 2.2 | 2.4 |

The stocks are press-cured at 292° F. for the times indicated.

| PHYSICAL PROPERTIES | | | |
|---|---|---|---|
| Modulus at 300%, p.s.i.: | | | |
| Time (min.): | | | |
| 45 | | 930 | 980 | 980 |
| 90 | 1000 | 1060 | 1080 |
| Tensile at 77° F., p.s.i.: | | | |
| Time (min.): | | | |
| 45 | 2320 | 2500 | 2940 |
| 90 | 2120 | 2510 | 2660 |
| Elongation at 77° F., percent: | | | |
| Time (min.): | | | |
| 45 | 510 | 510 | 550 |
| 90 | 470 | 500 | 510 |
| Tensile at 212° F., p.s.i.: | | | |
| Time (min.): | | | |
| 45 | 0 | 1000 | 1080 |
| 90 | 930 | 940 | 960 |
| Elongation at 212° F., percent: | | | |
| Time (min.): | | | |
| 45 | | 350 | 380 |
| 90 | 340 | 320 | 330 |
| Hardness, Shore A: | | | |
| Time (min.): | | | |
| 45 | | 61 | 59 | 52 |
| 90 | 63 | 60 | 54 |
| Abrasion resistance, percent: | | | |
| Time (min.): | | | |
| 45 | | 74 | 88 |
| 90 | 52 | 66 | 81 |
| Cut-growth resistance, kc./inch at 150° F.: | | | |
| Time (min.): | | | |
| 45 | | 26 | 17 | 40 |
| 90 | | | |
| Torsional hyst. at 280° F.: | | | |
| Time (min.): | | | |
| 45 | | 0.123 | 0.069 |
| 90 | 0.160 | 0.132 | 0.064 |
| Tear resistance at 250° F., lbs./inch: | | | |
| Time (min.): | | | |
| 45 | | 38 | 41 |
| 90 | 29 | 25 | 37 |

The superiority of stock J, which contains the polyepoxide, is particularly noteworthy with respect to tensile 77° F., abrasion resistance, torsional hysteresis at 280° F., cut-growth resistance, and hardness. Also, as mentioned above, it is to be noted that the hot-processing step is not required in order to produce this improvement.

EXAMPLE IV

This example shows that the polyepoxide, Oxiron 2000, is superior to the polyalkanolpolyamine, Nalco L-1718 used in Example III.

Four hundred parts of the oil-extended rubber SBR-1707 are mixed with 240 parts of Hi-Sil in the Banbury for 12 minutes at 230°–275° F. This masterbatch (MB) is split into four parts and compounded as follows on a cool two-roll mill:

| Stock Code | K | L | M | N |
|---|---|---|---|---|
| Materials: | | | | |
| MB | 160 | 160 | 160 | 160 |
| Nalco 1718 | 2 | 4 | | |
| Oxiron 2000 | | | 2.5 | 5 |
| Trimene Base | | | 1 | 1 |

The above is mixed in the Banbury at 300–310° F. for six minutes, dumped, passed through the cool two-roll mill eight times, then further compounded in the Banbury as follows:

| | | | | |
|---|---|---|---|---|
| Protox | 5 | 5 | 5 | 5 |
| Flexamine | 1 | 1 | 1 | 1 |
| Cumar MH1 | 6 | 6 | 6 | 6 |
| Stearic Acid | 3 | 3 | 3 | 3 |

The mixes are dumped, after eight minutes, at a dumping temperature of 230–260° F., banded on a two-roll mill at 150° F., and the following added on the cool mill:

| | | | | |
|---|---|---|---|---|
| MBTS | 0.75 | 0.75 | 0.75 | 0.75 |
| Sulfur | 3 | 3 | 3 | 3 |
| DOTG | 2.3 | 3.5 | 1.0 | 1.25 |

The stocks are press-cured at 292° F. for the times indicated.

| PHYSICAL PROPERTIES | | | | |
|---|---|---|---|---|
| 300% Modulus, p.s.i.: | | | | |
| Time (min.) | | | | |
| 45 | 1030 | 980 | 1090 | 1170 |
| 90 | 1050 | 1040 | 1310 | 1350 |
| Tensile at 77° F., p.s.i.: | | | | |
| Time (min.): | | | | |
| 45 | 2565 | 2355 | 2915 | 2930 |
| 90 | 2510 | 2335 | 2795 | 2930 |
| Elongation at 77° F., percent: | | | | |
| Time (min.): | | | | |
| 45 | 500 | 490 | 550 | 540 |
| 90 | 490 | 490 | 490 | 400 |
| Tensile at 212° F., p.s.i.: | | | | |
| Time (min.): | | | | |
| 45 | | | 1225 | 1225 |
| 90 | 935 | 823 | | |
| Cut-growth resistance, kc./in., 150° F.: | | | | |
| Time (min.): | | | | |
| 45 | 39 | 37 | 72 | 87 |
| 90 | 25 | 12 | 34 | 108 |
| Abrasion resistance, percent: | | | | |
| Time (min.): | | | | |
| 45 | | | 80 | 78 |
| 90 | 61 | 45 | | |
| Torsional hyst., 280° F.: | | | | |
| Time (min.): | | | | |
| 45 | | | 0.056 | 0.053 |
| 90 | 0.095 | 0.157 | | |
| Tear resistance at 250° F., lbs./inch: | | | | |
| Time (min.): | | | | |
| 45 | | | 46 | 89 |
| 90 | 28 | 34 | | |
| Hardness, Shore A: | | | | |
| Time (min.): | | | | |
| 45 | 52 | 57 | 51 | 52 |
| 90 | 54 | 60 | 53 | 56 |

It will be noted that stocks M and N which contain the polyepoxide are superior to stocks K and L (no polyepoxide) with respect to tensile at 77° F. and 212° F., cut-growth resistance, abrasion resistance, torsional hysteresis at 280° F., tear resistance, and hardness.

EXAMPLE V

This example illustrates the use of the polyepoxide Eponite 100 for improving the properties of hydrated silica-reinforced Hevea rubber.

Two hundred parts of smoked sheet rubber is mixed with 108 parts of Hi-Sil in the Banbury for eight minutes at 250–270° F. This masterbatch (MB) is split into two parts and compounded as follows on a cool two-roll mill.

| Stock Code | Parts by Weight | |
|---|---|---|
| | O | P |
| Materials: | | |
| MB | 154 | 154 |
| Cumar MH1½ | 6 | |
| Trimene Base | 1 | 1 |
| Eponite 100 | | 3 |

Each is now processed on the mill for seven minutes at a stock temperature of 290–320° F. Further compounding on the mill at 150° F. is as follows:

| | | |
|---|---|---|
| Protox | 5 | 5 |
| Flexamine | 1 | 1 |
| Stearic Acid | 3 | 3 |
| MBTS | 0.8 | 0.8 |
| Sulfur | 3 | 3 |
| DOTG | 1.0 | 0.7 |

The stocks are press-cured at 292° F. for the times indicated.

| PHYSICAL PROPERTIES | | |
|---|---|---|
| Modulus at 300%, p.s.i.: | | |
| Time (min.): 45 | 820 | 840 |
| Tensile at 77° F., p.s.i.: | | |
| Time (min.): 45 | 2,660 | 2,340 |
| Elongation at 77° F., p.s.i.: | | |
| Time (min.): 45 | 590 | 500 |
| Hardness, Shore A: | | |
| Time (min.): 45 | 46 | 42 |
| Tear resistance at 250° F., lbs./inch: | | |
| Time (min.): | | |
| 45 | 347 | 169 |
| 90 | | |
| Torsional hysteresis at 280° F.: | | |
| Time (min.): | | |
| 45 | 0.93 | 0.078 |
| 90 | | |
| Abrasion resistance, percent: | | |
| Time (min.): | | |
| 45 | 90 | 108 |
| 90 | | |

It is to be noted in particular that the hardness, torsional hysteresis at 280° F., and the abrasion resistance have been improved in stock P which contains the polyepoxide.

EXAMPLE VI

This example illustrates the use of the polyepoxide, Eponite 100, for improving the physical properties of Hi-Sil-reinforced SBR.

A masterbatch is prepared by mixing 200 parts by weight of SBR 1500 with 108 parts of Hi-Sil in the Banbury at 240° F. for twelve minutes. This is compounded on a cool mill as follows:

| Stock Code | Q | R |
|---|---|---|
| MB | 154 | 143 |
| Cumar MH1½ | 6 | |
| Trimene Base | 1 | 1 |
| Eponite 100 | | 2.5 |

After the above has been mixed it is processed on the mill at 300° F. for seven minutes. Compounding on the mill at 150° F. is continued as follows:

| | | |
|---|---|---|
| Cumar MH1½ | | 6 |
| Protox | 5 | 5 |
| Flexamine | 1 | 1 |
| Stearic Acid | 3 | 3 |
| MBTS | 0.75 | 0.75 |
| Sulfur | 3 | 3 |
| DOTG | 2.2 | 2.0 |

The stocks are press-cured at 292° F. for the times indicated.

| Time (min.) | 45 | 45 |
|---|---|---|
| Physical Properties: | | |
| 300% Modulus, p.s.i. | 1,260 | 1,290 |
| Tensile at 77° F., p.s.i. | 3,200 | 3,160 |
| Elongation at 77° F., percent | 510 | 490 |
| Hardness, Shore A | 60 | 59 |
| Torsional Hysteresis at 280° F. | 0.076 | 0.055 |
| Abrasion resistance (percent) | 96 | 105 |

It is noted that stock R, which contains the polyepoxide, is superior to stock Q which does not contain the polyepoxide, with respect to torsional hysteresis at elevated temperature and abrasion resistance.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A rubber composition consisting essentially of 100 parts of rubber selected from the group consisting of natural Hevea rubber, copolymers of a major proportion of butadiene and a minor proportion of styrene, copolymers of a major proportion of isobutylene and a minor proportion of a conjugated diene, terpolymers of ethylene and propylene with a minor proportion of a non-conjugated diene, 1,4-polybutadiene and 1,4-polyisoprene; 40 to 100 parts of a hydrated silica reinforcing filler having a particle size not greater than 1 micron and a degree of hydration that is not less than that represented by 0.02 gram of moisture per 100 square meters of surface area; and 1 to 10 parts of an epoxy resin selected from the group consisting of condensation products of epichlorhydrin and a diphenol, epoxidized polyolefines, and condensation products of epichlorhydrin and a polyhydric alcohol.

2. The rubber composition of claim 1 in which the epoxy resin is a condensation product of epichlorhydrin and 4,4'-isopropylidenediphenol.

3. A rubber composition of claim 1 in which the epoxy resin is a condensation product of epichlorhydrin and glycerin.

4. A vulcanized rubber composition consisting essentially of 100 parts of rubber selected from the group consisting of natural Hevea rubber, copolymers of a major proportion of butadiene and a minor proportion of styrene, copolymers of a major proportion of isobutylene and a minor proportion of a conjugated diene, terpolymers of ethylene and propylene with a minor proportion of a non-conjugated diene, 1,4-polybutadiene and 1,4-polyisoprene; 40 to 100 parts of a hydrated silica reinforcing filler having a particle size not greater than 1 micron and a degree of hydration that is not less than that represented by 0.02 gram of moisture per 100 square meters of surface area; and 1 to 10 parts of an epoxy resin selected from the group consisting of condensation products of epichlorhydrin and a diphenol, epoxidized polyolefines, and condensation products of epichlorhydrin and a polyhydric alcohol, and 3 parts of a vulcanizing agent.

5. The vulcanized rubber composition of claim 4 in which the vulcanizing agent is sulfur.

References Cited by the Examiner

UNITED STATES PATENTS 3,027,337    3/1962    Tritsch _____ 260—3

MURRAY TILLMAN, *Primary Examiner.*

D. B. REZNER, *Assistant Examiner.*